(12) United States Patent
Deneux et al.

(10) Patent No.: US 9,004,109 B2
(45) Date of Patent: Apr. 14, 2015

(54) BLOCK VALVE FOR VACUUM LINE OR NETWORK WITH EMERGENCY INPUT

(75) Inventors: Patrick Deneux, Milan (IT); Nathalie Demerville, Bovisio Masciago (IT); Vittorio De Nando, Milan (IT)

(73) Assignee: Air Liquide Sanità SpA, Milan (IT)

( * ) Notice: Subject to any disclaimer, the term of this patent is extended or adjusted under 35 U.S.C. 154(b) by 1918 days.

(21) Appl. No.: 12/142,143

(22) Filed: Jun. 19, 2008

(65) Prior Publication Data
US 2009/0001306 A1 Jan. 1, 2009

(30) Foreign Application Priority Data

Jun. 26, 2007 (EP) ..................................... 07301148

(51) Int. Cl.
*F16K 11/04* (2006.01)
*F16K 5/06* (2006.01)

(52) U.S. Cl.
CPC ................................... *F16K 5/0668* (2013.01)

(58) Field of Classification Search
USPC ................................................. 137/884, 887
See application file for complete search history.

(56) References Cited

U.S. PATENT DOCUMENTS

| | | | |
|---|---|---|---|
| 2,708,450 A | | 5/1955 | Mauer |
| 3,817,283 A | * | 6/1974 | Hewson ........................ 137/884 |
| 3,831,630 A | | 8/1974 | McGavin |
| 4,200,124 A | * | 4/1980 | Stratynski et al. ............. 137/885 |
| 4,281,683 A | * | 8/1981 | Hetherington et al. ........ 137/606 |
| 4,385,641 A | * | 5/1983 | Albertin et al. ............. 137/636.1 |
| 4,603,707 A | * | 8/1986 | Gregoire et al. ............... 137/557 |
| 4,887,645 A | * | 12/1989 | Kerger ........................... 137/884 |
| 6,273,140 B1 | * | 8/2001 | Tran .............................. 137/887 |
| 6,296,451 B1 | | 10/2001 | Guillet-Belaud et al. |
| 6,325,097 B1 | * | 12/2001 | Gallant et al. ................. 137/505 |

FOREIGN PATENT DOCUMENTS

| | | |
|---|---|---|
| DE | 32 39 255 | 4/1984 |
| EP | 1 026 567 | 8/2000 |

OTHER PUBLICATIONS

EP Search Report for EP 07 30 1148.

* cited by examiner

*Primary Examiner* — John Fox
(74) *Attorney, Agent, or Firm* — Allen E. White

(57) ABSTRACT

Block valve with emergency input, in particular for vacuum line or network, comprising a valve body traversed by a main fluid passage between a first orifice located at an upstream end of the said main passage and a second orifice located at a downstream end of the said main passage. The valve body further comprises a control device comprising a member operable manually by an operator and movable between at least an open position in which the said control device allows fluid communication between the first and second orifices, and a closed position in which the said control device interrupts any fluid communication between these orifices. An auxiliary fluid passage is fluidly connected via its upstream end to the said main passage between the control device and the first orifice, and comprises a third orifice at its downstream end.

3 Claims, 3 Drawing Sheets

BLOCK VALVE FOR VACUUM LINE OR NETWORK WITH EMERGENCY INPUT

This application claims priority from EP07301148.8 filed Jun. 26, 2007.

BACKGROUND

1. Field of the Invention

The invention relates to a valve useable on a vacuum line or network of vacuum lines, in particular a network of vacuum lines arranged in a hospital building.

2. Related Art

In the operating, emergency, intensive care or hospitalization rooms, it is common to use medical gases, such as oxygen, air, $N_2O/O_2$ mixtures, etc., to treat medium-term and long-term patients, and also for emergency operations. These gases are conveyed to their site of use in the hospital either in gas cylinders or similar, or via a gas line or network of lines arranged in the hospital.

Similarly, it is also common to arrange therein a vacuum line or a network of vacuum lines, that is lines under negative pressure, also running through the various sites or rooms where the vacuum is needed, in particular the treatment rooms, operating theatres, bedrooms, etc. Vacuum is in fact used there to draw off various liquids, such as blood, mucous, body fluids or similar, during the treatment provided to the patients.

A vacuum network comprises one or more lines in which a negative pressure is maintained by means of one or more vacuum pumps or other similar vacuum generating devices. This is called a negative pressure network or vacuum network, because the pressure prevailing therein is lower than the atmospheric pressure, that is lower than $10^6$ Pa (=1 bar).

The use of a vacuum network in a hospital environment is described in particular in document EP-A-1026567 which can be referred to for further details on this type of installation.

In fact, it may happen that the vacuum network can no longer perform its normal role because it suffers a failure or an accidental and unforeseeable interruption, for example due to damage caused to the fluid feed pipes, to the members for controlling, regulating and interrupting the flow of the various fluids in circulation.

It is then vitally necessary to guarantee a continuous presence of vacuum in the various operating rooms or similar.

For this purpose, it has been proposed by European patent application No. 07300937.5 filed by the Applicant to use a mobile functional unit for ensuring temporary distribution of medical gas and vacuum, comprising one or more standby medical gas cylinders for guaranteeing continuous distribution of the medical gases, and also a vacuum pump for creating a negative pressure in the line to which it is connected, thereby to guarantee continuous distribution of the vacuum.

One problem that arises is to be able to connect such a mobile unit easily and rapidly to the hospital vacuum network in case of failure of the vacuum network, in order to avoid any interruption of the vacuum distribution in the hospital or similar. The failure on the central vacuum network may be due for example to a problem in the vacuum plant or, obviously, on the distribution network, for example caused by a break of external vacuum lines during maintenance operations or similar.

SUMMARY OF THE INVENTION

It is an object of the present invention to propose a device for connecting the vacuum network rapidly and simply to a mobile vacuum unit or any other standby vacuum source.

One solution of the invention is a block valve with emergency input, in particular for vacuum line or network, comprising a valve body traversed by a main fluid passage between a first orifice located at an upstream end of the said main passage and a second orifice located at a downstream end of the said main passage (2), the said valve body further comprising:

a control device arranged on the said main passage, comprising a member operable manually by an operator and movable between at least:

an open position in which the said control device allows fluid communication between the first and second orifices, and a closed position in which the said control device interrupts any fluid communication between the first and second orifices, and an auxiliary fluid passage fluidly connected via its upstream end to the said main passage between the control device and the first orifice, the said auxiliary passage comprising a third orifice at its downstream end.

BRIEF DESCRIPTION OF THE FIGURES

The structure and operation of a vacuum block valve with emergency input according to the invention suitable for cooperating with a mobile standby functional unit is shown schematically in the figures appended hereto, in which.

DETAILED DESCRIPTION OF THE INVENTION

Figure 1:
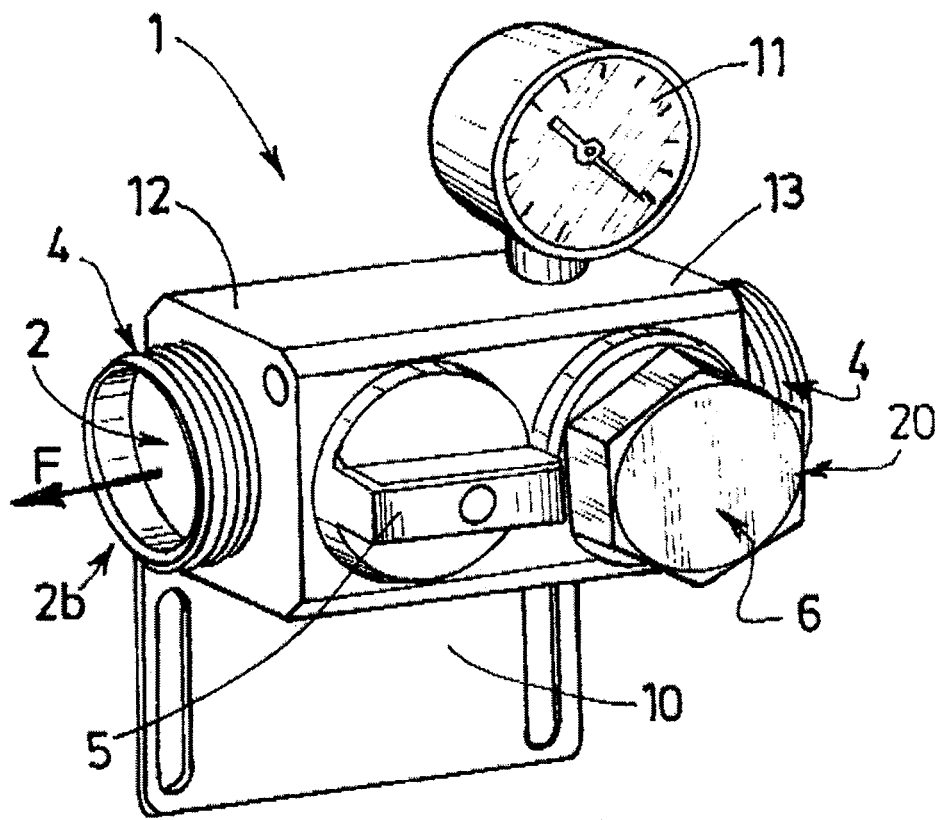
FIG. 1 is a diagram of a vacuum valve according to the invention with its fastening support.

According to each case, the valve of the invention may comprise one or more of the following features:

a shutter device shuts the third orifice, when the control device is in the open position, the upstream and downstream ends of the main passage having the first and second orifices, respectively, and the downstream end of the auxiliary passage having the third orifice, are provided with connecting means suitable and designed for connecting lines to the said ends, preferably the connecting means (4) are or comprise outer or inner threads, the control device comprises a rotating member operable by the operator between the said open and closed positions, the valve body is formed of two sub-units which are joined to one another, the first sub-unit comprising the part of the main passage comprising the downstream end of the said main passage with the second orifice and the control device, and the second sub-unit comprising the part of the main passage comprising the upstream end of the said main passage with the first orifice and the auxiliary passage with the third orifice, a negative pressure gauge is connected to the main passage or to the auxiliary passage between the control device and the first orifice or the third orifice, the valve body comprises a fastening device suitable and designed for fastening the said valve body to a support, in particular to a wall, the control device is an on/off type ball valve, it comprises an orifice for connection to a negative pressure sensor, the auxiliary fluid passage comprises a third orifice at its downstream end provided with a threaded plug which provides tightness when it is closed, preferably the said third orifice is designed and suitable for connecting a flexible tube connected to a standby device.

For a further understanding of the nature and objects for the present invention, reference should be made to the detailed description, taken in conjunction with the accompanying drawing, in which like elements are given the same or analogous reference numbers.

The valve 1 of the invention can be installed on a wall, essentially to replace a possible block valve of the conventional vacuum circuit possibly connected to a central vacuum installation comprising one or more vacuum pumps, preferably at least three vacuum pumps, in order to be connectable to the vacuum connector provided on the back wall of the mobile functional unit, such as described in European patent application No. 07300937.5, by means of an appropriate line, such as a flexible coupling of which the opposite ends are threaded.

The valve 1 comprises two sub-parts or sub-units 12, 13 joined to one another, that is a first sub-unit 12 equipped with a control device 5, such as a manually controlled on/off ball valve, and a second sub-unit 13 for connection to the functional unit 1 or similar.

This second sub-unit 13 is associated with a pressure gauge 11 for monitoring the negative pressure in the valve body 1.

Figure 4:
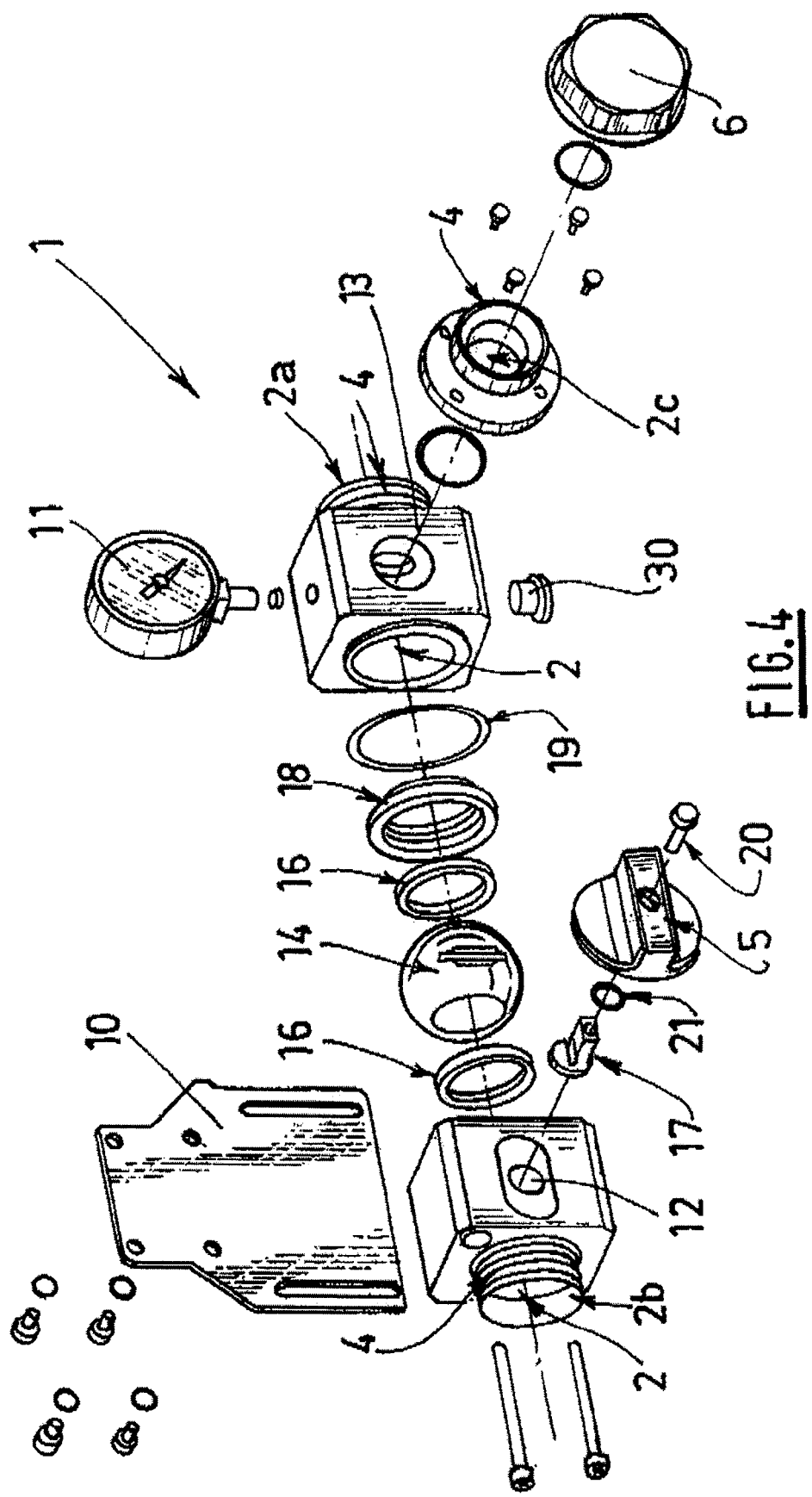
FIG. 4 is an exploded view of the valve in FIG. 1.

The valve body 1 may also be provided with a pressure sensor arranged at the third orifice 2c, for example a dedicated orifice located under the valve can be provided for this sensor 30, as shown in FIG. 4, located at the downstream end of the auxiliary passage 22.

The two sub-units 12, 13 are connected together in the manner shown in the exploded partial view in FIG. 4.

The sub-unit 12 comprises a valve, preferably of the on/off type, or closure device 5 with progressive control by a member or handle operable manually by the operator in the open and closed positions, or vice versa.

Figure 5:
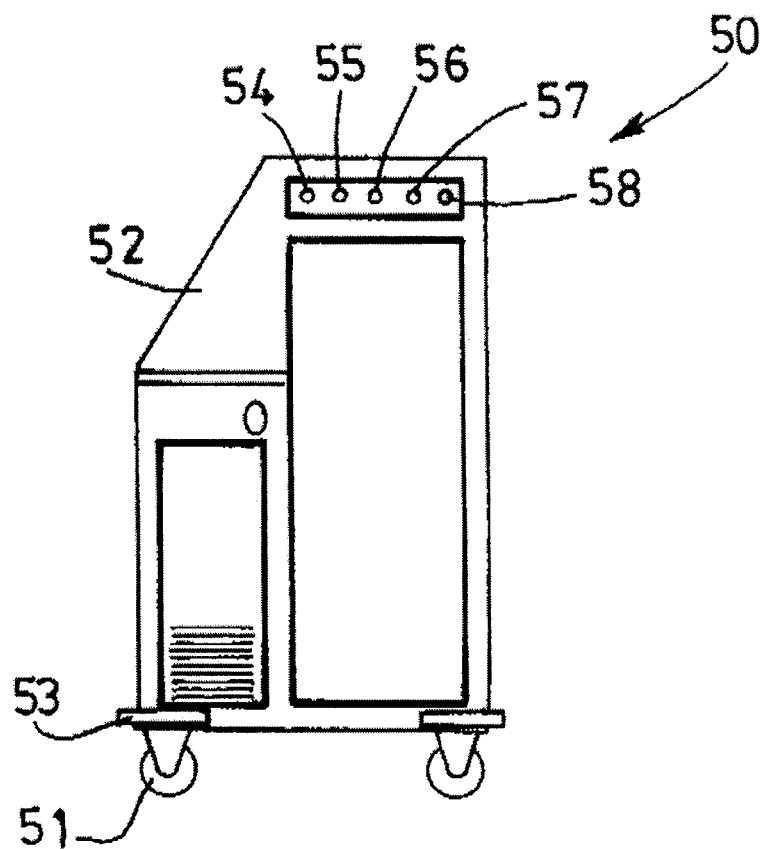
FIG. 5 is a view of a mobile standby functional unit to which the valve in FIG. 1 can be connected.

The sub-unit 13 comprises a connector that comprises a coupling threaded at its downstream end having the third orifice 2c normally closed by a plug 6 or similar, which is itself threaded, the said orifice 2c being located towards a standby functional unit like the one shown in FIG. 5.

The sub-units 12, 13 communicate fluidly together so as to form an internal conduit which enables the vacuum to flow in the direction of the arrow F in the main passage 2 or, as required, of the auxiliary passage 22 of the valve body 1. In fact, the valve of the invention is designed and suitable for managing the continuity of vacuum or negative pressure supply, whether the negative pressure is due to a failure of the vacuum plant or of the standby functional unit.

Fastening means 10, such as a support flange or any similar fastening device, are provided to support the sub-units 12, 13 of the valve body 1 and to facilitate its installation on a wall.

Figure 3:
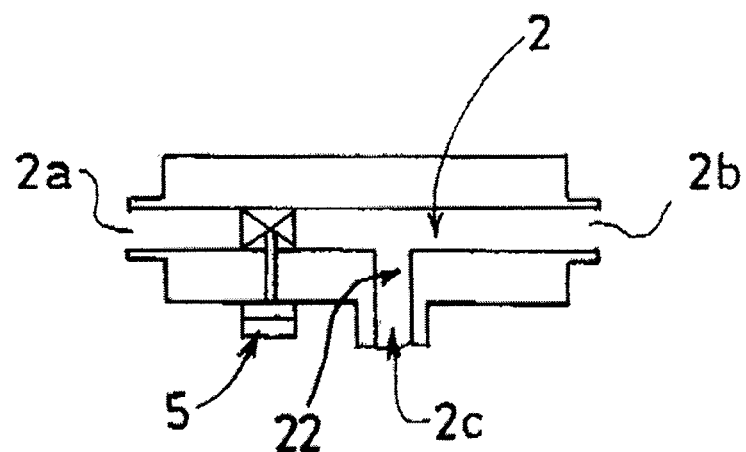
FIG. 3 is an internal operating diagram of the valve in FIG. 1 (plan view)

When the vacuum supply fault status appears in the vacuum network to which the valve of the invention is connected, the operable member 5 of the control means can be actuated by an operator to block the main passage 2 on which the valve 1 is inserted, as shown in FIG. 3.

In the context of the present invention, "vacuum network" means a line which is branched or a plurality of lines optionally connected to one another and within which vacuum prevails, that is a negative pressure, that is a pressure lower than the atmospheric pressure ($<10^6$ Pa). This vacuum is obtained by connecting the vacuum network fluidly to one or more vacuum pumps, as described in particular in document EP-A-1026567.

Furthermore, the shutter 6 is removed from the downstream end of the auxiliary passage 22 in order to release the third orifice 2c located at the downstream end of the said auxiliary passage 22 to which a mobile standby functional unit is then connected, comprising a vacuum pump, via a line, such as a flexible line, thereby serving to maintain the vacuum network under vacuum because the suction of the vacuum, that is the placing of the valve body 1 and of the network to which the valve of the invention is connected, under negative pressure, occurs by means of the vacuum pump located in the mobile standby unit.

Conventionally, such a flexible line is provided at its two ends with a threaded coupling or similar connecting means, and an operator can therefore connect it to an appropriate connection located on the mobile standby unit (FIG. 5), on the one hand, and to the downstream end with the third orifice 2c of the valve body 1 according to the invention, thereby to restore the vacuum distribution supplied by the vacuum pump of the mobile standby unit.

FIG. 4 shows an exploded view of the valve in FIG. 1, where it may be observed that the valve body 1 is formed of the two sub-units 12, 13 or blocks which are joined to one another, for example by screwing to one another or via any other fastening means.

The first sub-unit 12 comprises the part of the main passage 2 comprising the downstream end at which the second orifice 2b is located, that is the vacuum outlet if the vacuum is considered to pass through the valve body 1 in the direction of the arrow F in FIG. 1, and the control device operable by the operator.

More precisely, the control device comprises:
a rotating member 5 operable by the operator,
seals called "PTFE washers for the valve" 16 and 21 which guarantee the tightness of the sphere 14,
a sphere 14 which, when actuated by the rotating member 5, makes a 90° rotation and serves to "close the passage", so that the vacuum is then supplied by the standby gas source and no longer by the vacuum production plant,
a dowel 17 which, by fitting into the sphere 14, serves to rotate the sphere 14 when the rotating element 5 is actuated by the operator, a shell 18 suitable for joining the two blocks 12 and 13 of the valve device,
a silicone O-ring for the tightness connected to the second block of the valve.

In fact, the control device is preferably an on/off type ball valve in which the rotation of the rotating member 5 causes the rotation of the sphere 14, via the dowel 17, thereby allowing or interrupting the vacuum flow in the part of the main passage 2 arranged in the first sub-unit 12 and hence through the downstream orifice 2b.

Furthermore, the second sub-unit 13 comprises the part of the main passage 2 comprising the upstream end at which the first orifice 2a is located, that is the vacuum end inlet located towards the vacuum production plant if the vacuum is considered to pass through the valve body 1 in the direction of the arrow F in FIG. 1, and also the auxiliary passage 22 with the third orifice 2c, the said auxiliary passage 22 is connected to the main passage 2 inside the second sub-unit 13, that is upstream of the control device, in order to divert the vacuum through the third orifice 2c, when the blocking means 6, such as a screwed plug or cap or similar, is removed and releases the said third orifice 2c.

In fact, in normal operation, a blocking device 6 plugs the third orifice 2c and thereby prevents any passage of the vacuum through this third orifice 2c.

On the contrary, the blocking device 6 is removed when a vacuum distribution problem occurs, which requires interrupting the passage of the vacuum in the first sub-unit 12 by actuating the rotating member 5 of the control device 5, 17, 14, as shown in FIG. 3.

Figure 2A:
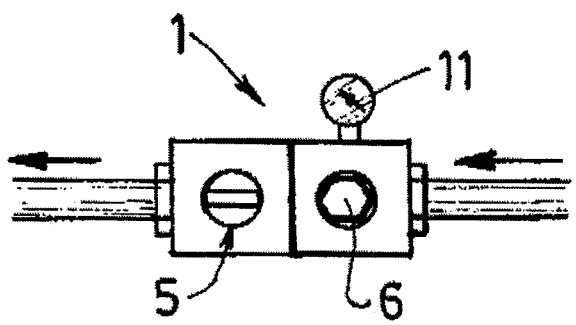
FIGS. 2a and 2b show the operation of the valve FIG. 1.
Figure 2B:
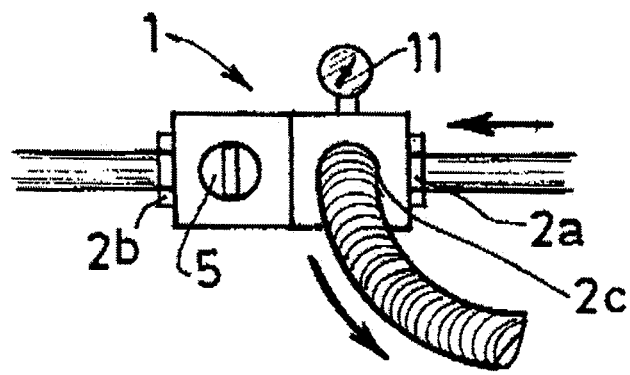

In fact, the control device 5, 17, 14 comprises a rotating member 5 operable by the operator between an open position (FIG. 2a) allowing the vacuum to flow in the passage 2 and a closed position (FIG. 2b) preventing the vacuum from flowing in the passage 2.

FIG. 5 is a diagram (side view) of a mobile standby unit 50 comprising a bottom 53 provided with wheels 51 and surmounted by side panels 52 forming an enclosure for placing the gas cylinders and a vacuum pump which are connected to connectors 53 to 58 carried by one or more of the said panels 52. These connectors 53 to 58 serve to provide a standby feed of gas ($O_2$, air, etc.) or of vacuum in case of failure of the gas sources or of the vacuum network.

However, it should be observed that the valve 1 of the invention has a structure and an operation that are completely independent of such a mobile standby unit 50 to which it may be connected. It is therefore possible to associate the valve 1 of the invention with medical gas distribution installations independently of the presence of such a mobile standby unit 50. It should be observed that the fact that the valve is compact and already prearranged with a built-in vacuum gauge, and at a location suitable for receiving the negative pressure sensor (vacuum switch) is also an original and uncommon feature for a block valve.

In other words, according to the invention, a block valve for the vacuum "distributed" by the central distribution network is incorporated in the hospital vacuum network or similar, the said valve enabling an operator to immediately and simply switch the vacuum supply to a standby vacuum source, in order to guarantee continuous distribution of vacuum in the various sites where it needs to be used in the hospital building.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A block valve with emergency input, comprising a valve body traversed by a main fluid passage between a first orifice located at an upstream end of the said main passage and a second orifice located at a downstream end of the main passage, the valve body further comprising:
   a control device arranged on the main passage, comprising an on/off type ball valve operable manually by an operator and movable between at least:
      an open position in which the control device allows fluid communication between the first and second orifices, and
      a closed position in which the control device interrupts any fluid communication between the first and second orifices, and
   an auxiliary fluid passage fluidly connected via its upstream end to the main passage between the control device and the first orifice, the auxiliary passage comprising a third orifice at its downstream end, the third orifice having a shutter device that shuts the third orifice when the control device is in the open position wherein a negative pressure gauge is connected to the main passage or to the auxiliary passage between the control device and the first orifice or the third orifice.

2. A block valve with emergency input, comprising a valve body traversed by a main fluid passage between a first orifice located at an upstream end of the said main passage and a second orifice located at a downstream end of the main passage, the valve body further comprising:
   a control device arranged on the main passage, comprising an on/off type ball valve operable manually by an operator and movable between at least:
      an open position in which the control device allows fluid communication between the first and second orifices, and
      a closed position in which the control device interrupts any fluid communication between the first and second orifices, and
   an auxiliary fluid passage fluidly connected via its upstream end to the main passage between the control device and the first orifice, the auxiliary passage comprising a third orifice at its downstream end, the third orifice having a shutter device that shuts the third orifice when the control device is in the open position wherein the upstream and downstream ends of the main passage having the first and second orifices, respectively, and the downstream end of the auxiliary passage having the third orifice, are provided with connecting means suitable and designed for connecting lines to the ends,
   wherein the control device comprises a rotating member operable by the operator between the open and closed positions, wherein the valve body is formed of two sub-units which are joined to one another, the first sub-unit comprising the part of the main passage comprising the downstream end of the main passage with the second orifice and the control device, and the second sub-unit comprising the part of the main passage comprising the upstream end of the said main passage with the first orifice and the auxiliary passage with the third orifice, and
   wherein a negative pressure gauge is connected to the main passage or to the auxiliary passage between the control device and the first orifice or the third orifice.

3. The valve of claim 2, wherein the valve body comprises a fastening device suitable and designed for fastening the valve body to a support.

* * * * *